United States Patent [19]

Chen et al.

[11] Patent Number: 4,610,955

[45] Date of Patent: Sep. 9, 1986

[54] ANTISTATIC COMPOSITIONS COMPRISING POLYMERIZED OXYALKYLENE MONOMERS AND AN INORGANIC TETRAFLUOROBORATE, PERFLUOROALKYL CARBOXYLATE, HEXAFLUOROPHOSPHATE OR PERFLUOROALKYLSULFONATE SALT

[75] Inventors: Janglin Chen, Rochester; James E. Kelly, Pittsford; James Plakunov, Rochester, all of N.Y.

[73] Assignee: Eastman Kodak Company, Rochester, N.Y.

[21] Appl. No.: 813,189

[22] Filed: Dec. 24, 1985

Related U.S. Application Data

[62] Division of Ser. No. 636,764, Aug. 1, 1984, Pat. No. 4,532,781.

[51] Int. Cl.$^4$ ................................................. G03C 1/82
[52] U.S. Cl. ..................................... 430/527; 430/528; 430/529; 430/530; 430/966; 252/8.9; 252/518; 252/521
[58] Field of Search ............... 252/8.9, 518, 521; 430/527, 528, 529, 530, 631, 637, 966; 428/421, 422, 341

[56] References Cited

U.S. PATENT DOCUMENTS 4,267,265  5/1981  Sugimoto et al. ................... 430/631
4,272,616  6/1981  Kashimoto et al. ................. 430/530

*Primary Examiner*—Jack P. Brammer
*Attorney, Agent, or Firm*—John R. Everett

[57] ABSTRACT

Antistatic compositions are disclosed comprising a hydrophilic binder, surface-active polymer having polymerized oxyalkylene monomers and an inorganic salt characterized in that the salt is selected from the group consisting of inorganic tetrafluoroborates, perfluoroalkyl carboxylates, hexafluorophosphates and perfluoroalkyl sulfonates.

6 Claims, No Drawings

ANTISTATIC COMPOSITIONS COMPRISING POLYMERIZED OXYALKYLENE MONOMERS AND AN INORGANIC TETRAFLUOROBORATE, PERFLUOROALKYL CARBOXYLATE, HEXAFLUOROPHOSPHATE OR PERFLUOROALKYLSULFONATE SALT

This is a division of application Ser. No. 636,764, filed Aug. 1, 1984, now U.S. Pat. No. 4,532,781.

FIELD OF THE INVENTION

The present invention relates to antistatic compositions and elements, including photographic elements. More specifically, the present invention relates to antistatic compositions comprising polymerized oxyalkylene monomers and inorganic salts and the use of such compositions as antistatic layers.

BACKGROUND OF THE INVENTION

The unwanted build-up of static electricity on an insulated support is well known. This phenomenon occurs on any element having an electrically insulating support surface.

In photographic elements, including electrophotographic elements, radiation-sensitive emulsions are usually coated on an insulating support. It has been a practice to reduce the electrostatic charge build-up by coating the surface of the support on which no photographic emulsions are coated with an antistatic composition. Sometimes a photographic emulsion layer is also coated with antistatic compositions. Such antistatic compositions decrease the surface resistivity thereby preventing the accumulation of electrical charges.

In U.S. Pat. No. 4,272,616 a homogeneous antistatic composition comprising a hydrophilic binder, such as gelatin, containing a nonionic polyoxyethylene surface-active agent and an alkali metal thiocyanate, iodide, perchlorate or periodate is disclosed. Such antistatic compositions are effective in reducing the surface resistivity of such supports to about $10^{11}$ ohms/sq at 30% relative humidity (RH). The problem is that such antistatics are not compatible with all photographic elements or the manufacture of such elements. Some of the alkali metal salts used therein have an adverse effect on some radiation-sensitive photographic emulsions. Other such salts, such as the perchlorates, are known to be explosive, thus producing a manufacturing hazard. The purpose of the present invention is to provide novel alternative antistatic compositions which have none of the above drawbacks of the above prior art salts.

SUMMARY OF THE INVENTION

The present invention provides an antistatic composition comprising a binder, a surface-active polymer having polymerized oxyalkylene monomers and an inorganic salt characterized in that the salt is selected from the group consisting of inorganic tetrafluoroborates, perfluoroalkyl carboxylate, hexafluorophosphate and perfluoroalkyl sulfonates.

Such compositions, when coated on insulating surfaces, reduce the surface resistivity of emulsion layers and supports as much as five orders of magnitude at 20% relative humidity. Moreover, such compositions do not cause the adverse effects on some radiation-sensitive emulsions or present the manufacturing problem of the above prior art compositions.

The alkylene portion of the oxyalkylene monomer refers to divalent hydrocarbon groups having 2 to 6 carbon atoms such as ethylene, propylene and butylene.

In one aspect, the present invention provides antistatic compositions wherein the oxyalkylene monomer is selected from the group consisting of oxyethylene and oxypropylene and the salt is selected from the group consisting of alkali metal tetrafluoroborates, alkali metal trifluoromethanesulfonates, alkali metal trifluoroacetates, alkali metal perfluorobutanoates, alkali metal hexafluorophosphates and alkali metal perfluorobutanesulfonates.

In another aspect, the present invention provides elements, including photographic elements, comprising layers of the antistatic compositions of this invention.

DETAILS OF THE INVENTION

The antistatic compositions of the present invention are generally prepared by combining the binder with an aqueous solution of the surface-active polymer containing the polymerized alkylene oxide monomers and an aqueous solution of the selected inorganic salt. The resulting antistatic composition can be coated on insulating supports to reduce the resistivity of the support.

The binder is generally present in the composition, on a dry basis, in an amount of from 10 to 95 weight percent. Useful binders for forming the antistatic compositions are selected from the many known photographically useful hydrophilic colloid compositions. Suitable hydrophilic colloids include both naturally occurring substances such as proteins, protein derivatives, cellulose derivatives, e.g. cellulose esters, gelatin, e.g. alkali-treated gelatin (cattle bone or hide gelatin) or acid-treated gelatin (pigskin gelatin), gelatin derivatives, e.g. acetylated gelatin, phthalated gelatin and the like, polysaccharides such as dextran, gum arabic, zein, casein, pectin, collagen derivatives, collodion, agar-agar, arrowroot, albumin and the like as described in numerous patents relating to the photographic arts.

Other hydrophilic colloids include colloidal albumin or casein, etc.; cellulose compounds such as carboxymethyl cellulose or hydroxyethyl cellulose, etc.; and synthetic hydrophilic colloids such as polyvinyl alcohol, poly-N-vinylpyrrolidone, polyacrylic acid copolymers, polyacrylamide or derivatives of them or partially hydrolyzed products of them, etc. If necessary, mixtures of two or more of these colloids are used. Among them, the most useful one is gelatin. The gelatin used here includes the so-called lime treated gelatin, acid treated gelatin and enzyme treated gelatin.

The surface-active polymers are generally present in the composition, on a dry basis, in an amount from 2 to 80 weight percent. Any surface-active polymer including homopolymers and copolymers and polymerized oxyalkylene monomers will be useful. Useful comonomers include alkyl siloxane monomers and vinyl monomers as illustrated in Table I infra. Useful surface-active polymers containing blocks of polymerized oxyalkylene monomers are disclosed in U.S. Pat. Nos. 2,917,480, 4,272,616, 4,047,958 and Japanese Patent Application Nos. 55/70837 and 52/16224. Some preferred polymers containing polymerized blocks of oxyalkylene are presented in Table I.

TABLE I (1) Block copolymers of propylene oxide and ethylene oxide available from BASF under the name Pluronic ®, e.g. Pluronic ® P123 and Pluronics ® 25R5:

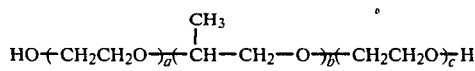

a plus c = 10 to 270
b = 20 to 70
or

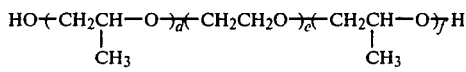

wherein d plus f = 10 to 160 and
e = 15 to 60.

(2) Tetrafunctional block copolymers derived from the addition of ethylene oxide and propylene oxide to ethylene diamine available from BASF under the name Tetronics ®, e.g. Tetronics ® T1304:

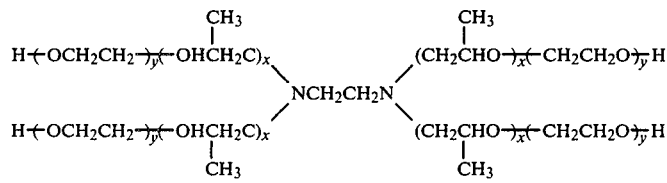

wherein x = 5 to 30 and
y = 10 to 150.

(3) Polyethoxylated derivatives of castor oil available from BASF under the name Industrol ® CO, e.g. Industrol ® CO-40:

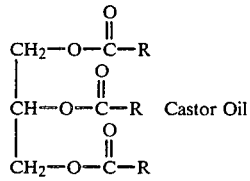

wherein R = $+CH_2{\overline{)_7}}CH=CH-CH_2-CH+CH_2{\overline{)_5}}CH_3$.

(4) Polyethoxylated ether derivatives of alkyl substituted acetylenic diols available from Air Products Co. under the name Surfynol ®, e.g. Surfynol ® 465:

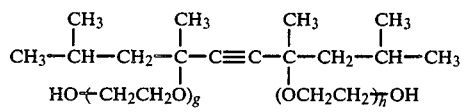

wherein g plus h = 10 to 30.

(5) Dimethylsiloxane-alkylene oxide linear BAB block copolymers available from Dow Corning under the trade name Q4-3667 ®:

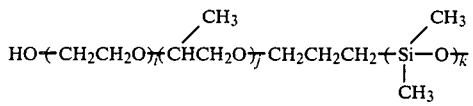

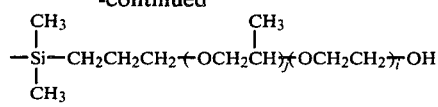

wherein $i \approx 10$ to 50;
$j \approx 0$ to 30 and
$k \approx 9$ to 17.

(6) Polyoxyethylene (20) sorbitan monolaurate available from ICI of America under the trade name Tween ® 20.

(7) Polyoxyethylene perfluorodecenyl ether available from ICI of America under the name Monflor ®, e.g. Monoflor ®-51:

wherein $n \approx 10$ and
$m \approx 20$ to 25.

(8) Dimethylsiloxane-ethylene oxide block copolymers available from Petrarch Systems, Inc. under the name Petrarch ® PS, e.g. PS071 and PS073:

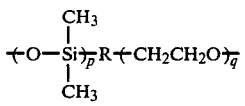

Carbide under the trade name Silwet, e.g. Silwet ® L-7605:

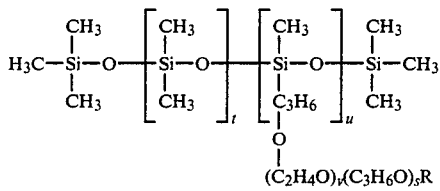

wherein $t \approx 5$ to 100;
$u \approx 2$ to 50;
$v \approx 5$ to 50 and
$s \approx 0$ to 50.

(11) Alkyl or unsubstituted phenoxypoly(oxyethylene)ethanol available from GAF under the trade name Igepal ® Compounds.

(12) Octylphenoxypoly(oxyethylene)ethanol available from Rohm & Haas under the trade name Triton ® X-405.

(13) Ethoxylated fatty alcohol polyoxyethylene ethers available from Emery Industries under the trade name Trycol ® LAL Compounds.

(14) $F(CF_2CF_2)_{3-8}CH_2CH_2O(CH_2CH_2O)_xH$ wherein x is 10 to 20 available from DuPont under the trade name Zonyl ® FSN.

The inorganic salt is generally present in the composition in an amount of from 2 to 80 weight percent. The inorganic salt is a tetrafluoroborate, perfluoroalkyl carboxylate, hexafluorophosphate or perfluoroalkyl sulfonate. The alkyl group in perfluoroalkyl has 2 to 20 carbon atoms. Alkali and alkaline earth metals and ammonium salts of such materials are examples of useful inorganic salts. Examples of alkali metals include potassium, sodium, lithium, cesium and rubidium. Examples of alkaline earth metals are beryllium, calcium, strontium and barium. Some preferred salts are $CF_3SO_3K$, $LiBF_4$, $NaBF_4$, $C_4F_9SO_3K$, $C_3F_7COOK$, $KPF_6$ and $CF_3SO_3Li$.

Coated layers of the antistatic composition should include sufficient polyoxyalkylene surface-active agents and inorganic salts to exhibit the antistatic effect. A preferred amount of the polyoxyalkylene surface-active agent is in the range of about 5 to 500 mg/m$^2$ and particularly about 20 to 200 mg/m$^2$. A preferred amount of the salt used together therewith is in the range of about 5 to 500 mg/m$^2$ and particularly about 10 to 200 mg/m$^2$. Binder coverage should be in the range of 0.1 to 10 g/m$^2$. Of course, the above-described ranges vary according to the type of the photographic film base, photographic composition, form or application method used. A suitable ratio for the amount of polyoxyalkylene compound to salt is about 1:0.1 to 5.0 and preferably about 1:0.3 to 2 by weight.

The compositions can be coated on a wide variety of supports to form a wide variety of useful antistatic elements. The support can be a number of materials which can take a number of forms. For example, the compositions can be coated on polymeric materials such as poly(ethylene terephthalate), cellulose acetate, polystyrene, poly(methyl methacrylate) and the like. The compositions can also be coated on other supports such as glass, paper including resin-coated paper, and metals. Fibers including synthetic fibers, useful for weaving into cloth, can be used as the support. Planar supports such as polymeric films useful in photography are particularly useful. In addition, the compositions of the present invention can be coated onto virtually any article where it is desired to decrease resistivity. For example, the compositions can be coated on small plastic parts to prevent the unwanted buildup of static electricity or coated on small polymeric spheres or other shapes such as those used for toners in electrography and the like.

The compositions of the present invention can be applied to the support using any suitable method. For example, the compositions can be coated by spray coating, fluidized bed coating, dip coating, doctor blade coating or extrusion hopper coating, to mention but a few.

In some embodiments, it may be desirable to coat the layer of the antistatic compositions of the present invention with a protective layer. The protective layer can be present for a variety of reasons. For example, the protective layer can be an abrasion-resistant layer or a layer which provides other desirable physical properties. In many embodiments, for example, it can be desirable to protect the layers of the antistatic composition from conditions which could cause the leaching of one of the components. Where the antistatic layer of the present invention is part of an element having a basic layer, it can be desirable to provide a barrier in the form of a protective layer to prevent the contact of the antistatic layer by base. The protective layer is preferably a film-forming polymer which can be applied using coating techniques such as those described above for the conductive layer itself. Suitable film-forming resins include cellulose acetate, cellulose acetate butyrate, poly(methyl methacrylate), polyesters, polycarbonates and the like.

The coating compositions of the present invention are particularly useful in forming antistatic layers for photographic elements. Elements of this type comprise a support having coated thereon at least one rediation-sensitive layer. Layers of the antistatic composition can be in any position in the photographic element. The antistatic compositions are advantageously coated directly on the support which can have a thin subbing layer as is known in the art, and are then overcoated with the described protective layer. Alternatively, the antistatic layers can be on the same side of the support as the radiation-sensitive materials and the protective layers can be included as interlayers or overcoats, if desired.

The radiation-sensitive layers of the photographic or electrophotographic elements can take a wide variety of forms. The layers can comprise photographic silver salt emulsions, such as silver halide emulsions; diazotype compositions; vesicular image-forming compositions; photopolymerizable compositions; electrophotographic compositions comprising radiation-sensitive semiconductors; and the like. Photographic silver halide emulsions including, but not limited to, single or multilayer, black-and-white or color, with or without incorporated couplers are particularly preferred and are described, for example, in *Research Disclosure*, Item 17643 (Silver Halide Elements), December 1978, pages 22-31 and *Research Disclosure*, Item 18431 (Radiographic Elements), August 1979, pages 433-41.

By practicing the present invention, the problems caused by static charges generated in production and use are significantly diminished. For example, the occurrence of static marks caused by contact between the emulsion face and the back face of the photographic sensitive material, contact of one emulsion face with another emulsion face and contact of the photographic sensitive material with other materials such as rubber, metal, plastics and fluorescent intensifying screens is remarkably reduced by practicing the present invention. Further, surface resistivity of the photographic sensitive materials remarkably decreases when the salts and polyoxyalkylene compounds in the present invention are used together in a hydrophilic binder and applied to the outside layer of the photographic sensitive materials.

Moreover, the combinations of compounds used in the present invention effectively prevent the static charges generated in placing films in cassettes or loading films in cameras or in taking many photographs continuously at a high speed by an automatic camera. The antistatic effect does not deteriorate with the lapse of time or low humidity.

The present invention is now illustrated in more detail by reference to the following examples. However, the present invention is not to be construed as being limited to these examples.

The resistance of the surface of the coatings of the present invention can be measured using well-known techniques. The resistivity is the electrical resistance of a square of a thin film of material measured in the plane of the material between opposite sides. This is described more fully in R. E. Atchison, *Aust. J. Appl. Sci.*, 10, (1954).

The following examples are presented to further clarify the invention.

EXAMPLE 1

Single Layer Coatings

A layer of deionized bone gelatin was coated on a polyester support at a level of 0.097 g/m² (Example 1A). Additions of surface-active polymers having polymerized oxyalkylene monomers and of salts were made (Examples 1B–1U) as listed in Table I, and at the levels (mg/m² of coating) indicated.

Samples of the coatings were conditioned to 50%, 20% and/or 15% relative humidity. The surface resistivity was measured at 24° C. using a Keithly Picoammeter, according to the procedure of ASTM Standard D-257. The results are tabulated in Table II.

amples 1F–1U illustrate the similar reductions in surface resistivity provided by other polymer and salt combinations of the invention.

EXAMPLE 2

Medical X-ray Film Coatings

A radiographic emulsion layer was coated on a polyester support at a level of 2.37 gm Ag/m² and 1.51 gm gelatin/m². The emulsion comprised cubic silver bromoiodide grains of 0.9 μm mean size, and 4 mole percent iodide. The emulsion layer also contained $KNO_3$ at 129 mg/m². Over the emulsion a protective layer was coated at a level of 0.65 g/m². Surface-active polymers and alkali metal salts were added to the latter overcoat

TABLE II

Single Layer Gelatin Coatings

| Example No. | Table I Polymer | Salt | Coverage, mg/m² Polymer | Coverage, mg/m² Salt | Surface Resistivity Ohms/Square 50% RH | Surface Resistivity Ohms/Square 20% RH | Surface Resistivity Ohms/Square 15% RH | Comments |
|---|---|---|---|---|---|---|---|---|
| 1A | none | none | 0 | 0 | $2 \times 10^{14}$ | $>2 \times 10^{15}$ | — | Control |
| 1B | 10 (Silwet L7605) | none | 160 | 0 | $6.3 \times 10^{12}$ | $9.5 \times 10^{13}$ | — | Polymer alone |
| 1C | none | $CF_3SO_3K$ | 0 | 160 | $1 \times 10^{13}$ | $6.3 \times 10^{14}$ | — | Salt alone |
| 1D | 10 | $CF_3SO_3K$ | 129 | 32 | $2 \times 10^9$ | $4 \times 10^9$ | — | Invention, high level salt |
| 1E | 10 | $CF_3SO_3K$ | 65 | 16 | $6.3 \times 10^9$ | $1.3 \times 10^{10}$ | — | Invention, medium level salt |
| 1F | 10 | $CF_3SO_3K$ | 32 | 9 | $3 \times 10^{10}$ | $5 \times 10^{10}$ | — | Invention, low level salt |
| 1G | 10 | $C_4F_9SO_3K$ | 140 | 22 | $9.5 \times 10^9$ | $1 \times 10^{10}$ | — | Invention |
| 1H | 10 | $C_3F_7COOK$ | 140 | 22 | $2.5 \times 10^9$ | $1 \times 10^{10}$ | — | Invention |
| 1I | 10 | $CF_3COOK$ | 81 | 102 | $2 \times 10^9$ | $3 \times 10^{10}$ | — | Invention |
| 1J | 1 (Pluronic ® P123) | $LiBF_4$ | 160 | 160 | $1 \times 10^{10}$ | $4 \times 10^{10}$ | — | Invention |
| 1K | 1 | $CF_3SO_3K$ | 129 | 32 | $3 \times 10^{10}$ | — | $9.5 \times 10^{10}$ | Invention |
| 1L | 5 (Q4-3667) | $CF_3SO_3K$ | 129 | 32 | $9.5 \times 10^9$ | — | $2 \times 10^{10}$ | Invention |
| 1M | 5 | $CF_3SO_3K$ | 160 | 160 | $1 \times 10^{10}$ | $2.5 \times 10^{10}$ | — | Invention |
| 1N | 4 (Surfynol ® 485) | $CF_3SO_3K$ | 81 | 81 | — | — | $1 \times 10^{10}$ | Invention |
| 1O | 4 (Surfynol ® 465) | $CF_3SO_3K$ | 81 | 81 | — | — | $1.3 \times 10^{10}$ | Invention |
| 1P | 1 (Pluronic ® F87) | $CF_3SO_3K$ | 81 | 81 | — | — | $2 \times 10^{10}$ | Invention |
| 1Q | 1 (Pluronic ® 10R5) | $CF_3SO_3K$ | 81 | 81 | — | — | $1.6 \times 10^{10}$ | Invention |
| 1R | 2 (Tetronic ® T-1304) | $CF_3SO_3Li$ | 81 | 81 | — | $1 \times 10^{11}$ | — | Invention |
| 1S | 8 (Petrarch ® PS073) | $CF_3SO_3Li$ | 81 | 81 | — | $6.3 \times 10^{10}$ | — | Invention |
| 1T | 8 (Petrarch ® PS197) | $CF_3SO_3Li$ | 81 | 81 | — | $2.5 \times 10^{10}$ | — | Invention |

As compared to the control Example 1A, Example 1B and 1C show significant reductions in surface sensitivity when the surface-active polymer or the salt are added separately. However, the combination of salt and polymer of this invention in Example 1D shows a much greater, synergistic reduction in surface resistivity of five orders of magnitude at 50% RH, and even more at 20% RH. This effectiveness is largely retained even at the lower addenda levels of Examples 1E and 1F. Exas indicated in Table III. The surface resistivity was determined at 50% and 20% relative humidity as described for Example 1 except a Tera ohmmeter (Guidelines Instruments Model 9520) was used to measure resistivity. The results are tabulated in Table III. Reduction of this resistivity of three orders of magnitude or more are obtained at 20% RH using the antistatic composition of this invention.

TABLE III

Radiographic Emulsion Overcoats

| Example No. | Table I Polymer | Salt | Coverage, mg/m² Polymer | Coverage, mg/m² Salt | Surface Resistivity Ohms/Square 50% RH | Surface Resistivity Ohms/Square 20% RH | Comments |
|---|---|---|---|---|---|---|---|
| 2A | none | none | 0 | 0 | $5.4 \times 10^{11}$ | $>1 \times 10^{13}$ | Control |
| 2B | 5 (Q4-3667) | $CF_3SO_3K$ | 161 | 161 | $2.3 \times 10^{10}$ | $6.8 \times 10^{10}$ | Invention |

TABLE III-continued

| | | | Radiographic Emulsion Overcoats | | | | |
|---|---|---|---|---|---|---|---|
| Example No. | Table I Polymer | Salt | Coverage, mg/m$^2$ Polymer | Salt | Surface Resistivity Ohms/Square 50% RH | 20% RH | Comments |
| 2C | 5 | CF$_3$SO$_3$K | 161 | 81 | $2.2 \times 10^{10}$ | $6.2 \times 10^{10}$ | Invention |

EXAMPLE 3

Control Coating

On a polyester support was coated a layer of deionized bone gelatin at a level of 2.71 g/m$^2$. Over this was applied a deionized bone gelatin overcoat at 0.89 g/m$^2$. The coating was hardened with bis(vinylsulfonylmethyl)ether at 2% of the total dry gelatin weight. The surface resistivity was measured as described in the previous example.

Coating of the Invention

The coating of the invention was prepared as described for the control coating, except that 215 mg/m$^2$ each of polymer 10) of Table I (Union Carbide Silwet® L7605) and of potassium hexafluorophosphate (KPF$_6$) were added to the overcoat layer. The resistivity was measured, giving the values tabulated below in Table IV.

TABLE IV

| Coating No. | Table I Polymer | Salt | Coverage, mg/m$^2$ Polymer | Salt | Surface Resistivity 50% RH | 20% RH |
|---|---|---|---|---|---|---|
| Control | — | — | — | — | $5.3 \times 10^{12}$ | $>1 \times 10^{13}$ |
| Example 3 | 10 | KPF$_6$ | 215 | 215 | $5.6 \times 10^{10}$ | $1.6 \times 10^{11}$ |

The surface resistivity of the coating of the invention was greatly reduced at both 50% and 20% RH.

EXAMPLE 4

Sensitometric Effects of Salts of U.S. Pat. No. 4,272,616 Compared to the Salts Used in the Present Invention On a polyester support was coated a green-sensitized silver bromoiodide medical x-ray emulsion of mean grain size 0.75 μm, containing 3.4 mole % iodide, at 1.9 g/m$^2$ Ag and 1.5 g/m$^2$ gelatin. Over the emulsion layer was coated a protective layer containing 0.65 g/m$^2$ gelatin. Salts were added to the emulsion layer as indicated in Table V, in each case at a level of $1.08 \times 10^{-3}$ moles/m$^2$.

Samples of the coatings were exposed through a graduated density scale for 1/50 seconds to a 600-watt quartz halogen source filtered with a Corning® C-4010 filter to simulate a green-emitting fluorescent screen exposure. The samples were then processed in a KODAK X-OMAT® processor, Model M6. Development was for 26 seconds at 35° C., fixing for 21 seconds at 35° C., and washing for 16 seconds at 32° C., using KODAK RP X-OMAT® Developer and Fix.

The sensitometric results are tabulated in Table V. The speed was measured at a density of 1.0.

TABLE V

| Coating No. | Salt Added to Emulsion | Relative Speed | Contrast | Fog | D$_{max}$ |
|---|---|---|---|---|---|
| Control | none | 100 | 2.80 | .09 | 3.63 |
| 1 | KI (prior art) | 27 | — | .02 | 2.16 |
| 2 | CF$_3$SO$_3$Li | 107 | 2.96 | .02 | 3.65 |
| 3 | NaBF$_4$ | 110 | 3.02 | .04 | 3.86 |
| 4 | KPF$_6$ | 105 | 2.88 | .04 | 3.65 |
| 5 | CF$_3$CO$_2$Na | 102 | 3.05 | .04 | 3.88 |

Addition of prior art KI caused a large loss in speed, contrast and D$_{max}$. The contrast was too low to measure. On the contrary, addition in Coating Nos. 2-5 of the salts used in the present invention caused no adverse sensitometric effect.

The invention has been described in detail with particular reference to preferred embodiments thereof, but it will be understood that variations and modifications can be effected within the spirit and scope of the invention.

We claim:

1. An antistatic composition comprising a hydrophilic binder, a surface-active polymer having polymerized oxyalkylene monomers and an inorganic salt characterized in that the salt is selected from the group consisting of inorganic tetrafluoroborates, perfluoroalkyl carboxylates, hexafluorophosphates and perfluoroalkyl sulfonates.

2. The composition of claim 1 wherein the oxyalkylene monomers are selected from the group consisting of oxyethylene and oxypropylene and the salt is selected from the group consisting of alkali metal tetrafluoroborates, alkali metal trifluoromethanesulfonates, alkali metal trifluoroacetates, alkali metal perfluorobutanoates, alkali hexafluorophosphates and alkali metal perfluorobutanesulfonates.

3. The composition of claim 2 wherein the polymer is selected from Table I herein and the salt is selected from the group consisting of potassium trifluoromethanesulfonate, potassium perfluorobutanesulfonate, potassium perfluorobutanoate, lithium tetrafluoroborate and lithium trifluoromethanesulfonate.

4. The composition of claim 1 wherein the weight ratio of the polymer to the inorganic salt is in the range of from 1:0.1 to 1:5.

5. The composition of claim 1 comprising from 2 to 80 weight percent of polymerized alkylene monomers; from 2 to 80 weight percent of inorganic salt; and 10 to 95 weight percent hydrophilic binder.

6. The composition of claim 5 wherein the polymerized oxyalkylene monomer is oxyethylene and the salt is CF$_3$SO$_3$Li.

* * * * *

UNITED STATES PATENT AND TRADEMARK OFFICE
CERTIFICATE OF CORRECTION

PATENT NO. : 4,610,955
DATED : September 9, 1986
INVENTOR(S) : Janglin Chen, James E. Kelly and James Plakunov It is certified that error appears in the above-identified patent and that said Letters Patent are hereby corrected as shown below:

Title page, Item 62 "Related U.S. Application Data" part reading

"Pat. No. 4,532,781."

should read

--Pat. No. 4,582,781.--

Signed and Sealed this

Third Day of February, 1987

Attest:

DONALD J. QUIGG

Attesting Officer

Commissioner of Patents and Trademarks